United States Patent Office 3,340,399
Patented Sept. 5, 1967

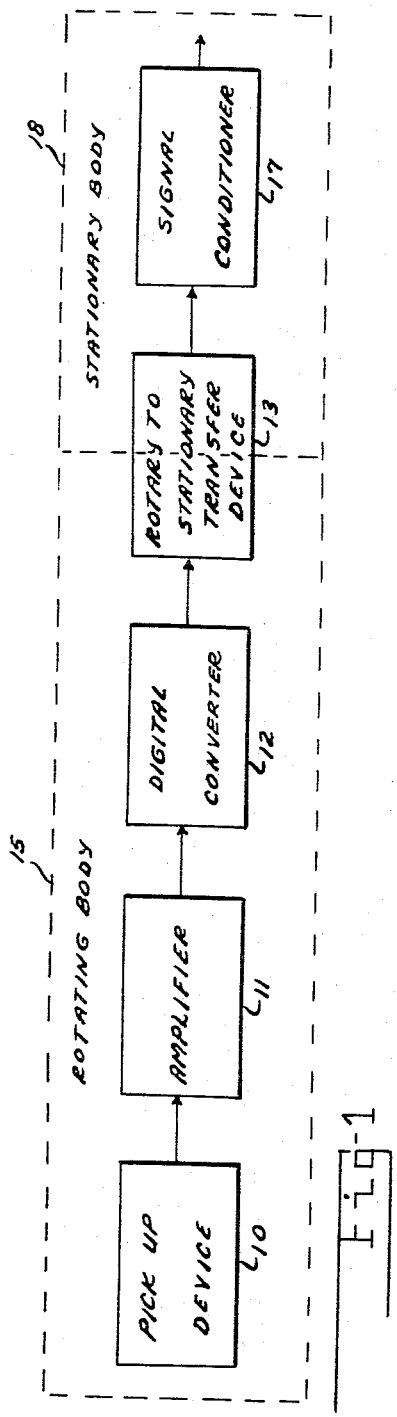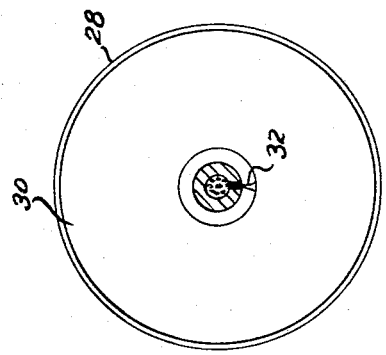

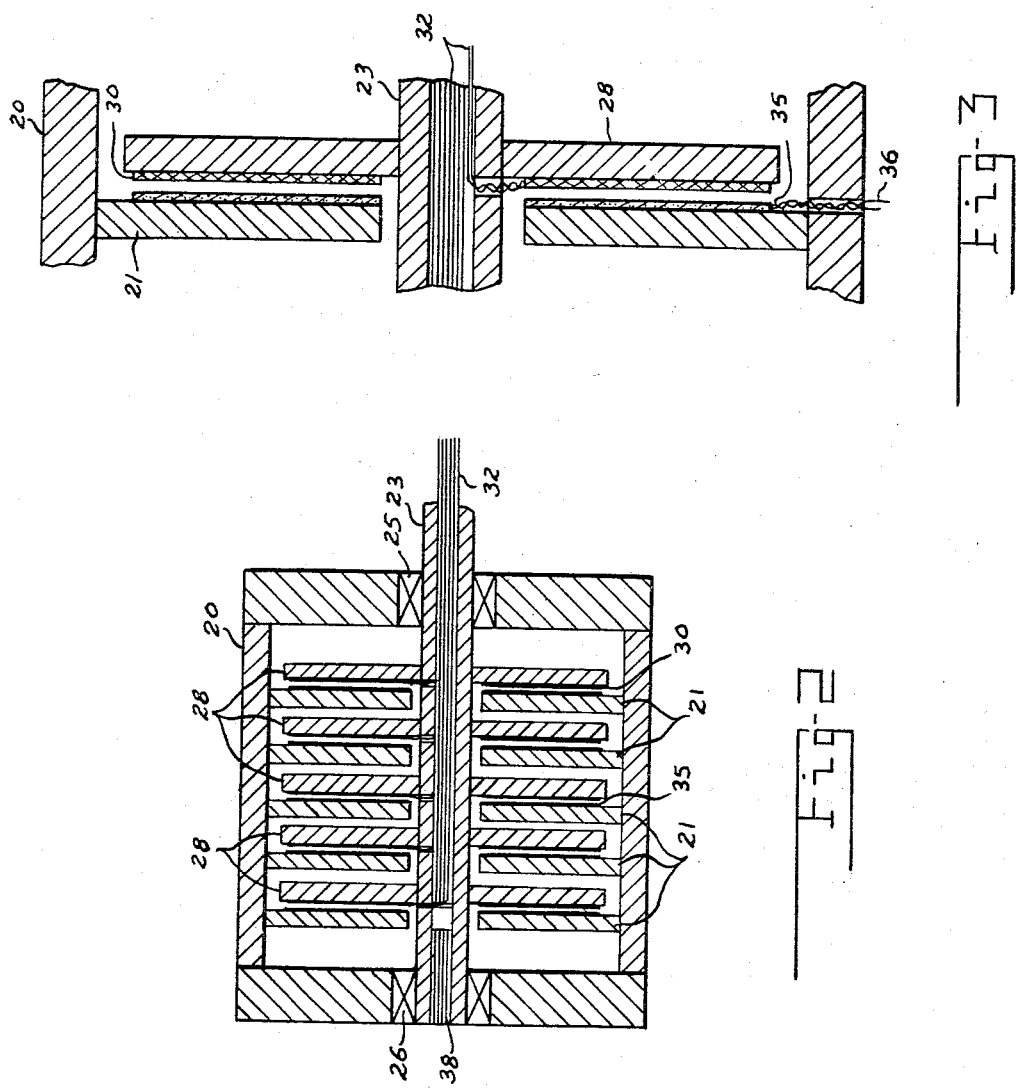

3,340,399
ELECTRO-OPTICAL DEVICE FOR TRANSFERRING SIGNALS FROM A ROTATING BODY
Walter S. Moore, 736 Aguirre, San Dimas, Calif. 91773
Filed Nov. 17, 1964, Ser. No. 412,298
4 Claims. (Cl. 250—217)

ABSTRACT OF THE DISCLOSURE

An annular light source is mounted on an annular rotating member connected to a rotating body. A stationary annular photosensitive detector is positioned adjacent the annular light source. Radiation from the light source is controlled by an intelligence bearing signal applied to the light source. An output is taken from the photosensitive detector.

The invention described herein may be manufactured and used by or for the United States Government for governmental purposes without the payment to me of any royalty thereon.

This invention relates to an electro-optical system for transferring intelligence bearing signals from a rotating body to a stationary body.

One object of the invention is to provide an intelligence bearing signal transfer device which is not vulnerable to degradation and failure due to environmental conditions such as heat, cold, shock and vibration.

Another object of the invention is to provide an intelligence bearing signal transfer device which is less susceptible to the generation of noise than the typical slip ring.

These and other objects will be more fully understood from the following detailed description taken with the drawing, wherein:

FIG. 1 is a block diagram of a system in which the signal transfer device of the invention may be used;

FIG. 2 is a sectional view of a signal transfer device of the invention showing a plurality of signal transfer elements;

FIG. 3 is an enlarged sectional view of one of the signal transfer elements of the device of FIG. 2; and FIG. 4 is a plan view of one of the electroluminescent panels of the device of FIG. 2.

In conventional equipment slip rings are used to establish an electrical path for a signal between a rotating body and a stationary body. The signal is usually applied to the ring on the rotating body and the signal is picked off with a contact or wiper. This device has certain weaknesses such as friction versus conductivity tradeoff, contact noise generation, degradation due to wear and hostile environments and danger in explosive environments. The device of this invention uses light as a means for transferring intelligence bearing signals from a rotating body to a stationary body. The intelligence bearing signal within the rotating body is used to control a radiation source, such as light. A detector for receiving the signal is located on the stationary body to convert the light signal back into an electrical signal. So as to make the device insensitive to the relative angular positions of the light source and the detector, annular light sources and annular detectors are used.

Reference is now made to FIG. 1 of the drawing which shows a pickup device 10, an amplifier 11, a digital converter 12 and a portion of the transfer device 13 on the rotating body shown schematically at 15. The other portion of the transfer device 13 and the signal conditioning circuit 17 is shown on the stationary body shown schematically at 18. The signal conditioning circuit can include amplifying, filtering and distribution or other circuits depending on the particular use, wherein the signal is prepared for application to a meter an oscilloscope or data link or some such utilization system.

The transfer device 13 as shown in FIGS. 2, 3 and 4, consists of a housing 20, having a plurality of annular members 21 secured therein in any well known manner; for example, by means of welding or with screws passing through the housing 20. A shaft 23 connected to the rotating equipment, not shown in these figures, passes through the housing 20 and is supported by bearings 25 and 26. A plurality of annular members 28 are secured to the shaft 23 in any well known manner as by welding.

An annular electroluminescent panel 30 is secured to the annular members 28 in any well known manner; for example, by the use of an adhesive. The intelligence signal is applied to the electroluminescent panels over leads shown generally at 32. Annular signal detectors 35 such as silicon cells or lead sulfide cells are located on the stationary annular members 21 and may be secured thereto for example by the use of an adhesive. The output signal is taken off at 36 as shown in FIG. 3. The number of transfer elements used will be determined by the specific requirements. A spline 38 may be provided for driving the rotating equipment through the transfer device if desired. While electroluminescent cells and silicon cells have been recited it is obvious that other light sources and detectors could be used as long as the device is insensitive to the relative angular position of the light source and the detector. Also it is to be understood that the device could be used together with slip rings used for example to supply power to the rotating equipment.

The device of FIG. 2 may be assembled in any manner known in the art, for example by providing two half elements for the housing 20 and annular members 21 which can be fitted around the rotating element with the members 21 interleaved between members 28.

There is thus provided a device for transferring intelligence bearing signals from a rotating body to a stationary body.

While certain specific embodiments have been described it is to be understood that numerous changes may be made without departing from the general principles and scope of the invention.

I claim:

1. A device for transferring intelligence bearing signals from a rotating body to a stationary body comprising: a housing; a shaft supported for rotation within said housing; an annular member secured to said shaft; an annular member secured to said housing spaced from the annular member secured to said shaft; a substantially continuous annular light source attached to the annular member attached to said shaft; a susbtantially continuous annular photo voltaic detector attached to the annular member secured to said housing on the side thereof adjacent said light source; means for applying the intelligence bearing signal to said light source and output means connected to said photo voltaic detector.

2. A device for transferring intelligence bearing signals from a rotating body to a stationary body comprising, a housing; a shaft supported for rotation within said housing; a plurality of annular members secured to said shaft; a plurality of annular members secured to said housing and interleaved and spaced from the annular members secured to said shaft; a substantially continuous annular light source attached to each of the annular members attached to said shaft; a substantially continuous annular photo voltaic detector attached to each of the annular members secured to said housing on the side of the annular members adjacent said light sources; means for applying intelligence bearing signals to said light sources and output means connected to said photo voltaic detectors.

3. A device for transferring intelligence bearing signals from a rotating body to a stationary body comprising, a housing; a shaft supported for rotation within said housing; a plurality of annular members secured to said shaft; a plurality of annular members secured to said housing and interleaved and spaced from the annular members secured to said shaft; a substantially continuous annular electroluminescent cell attached to each of the annular members attached to said shaft a substantially continuous annular silicon detector attached to each of the annular members secured to said housing on the side thereof adjacent said light sources; means for applying intelligence bearing signals to said electroluminescent cells and output means connected to said silicon detectors.

4. A device for transferring intelligence bearing signals between a rotating body and a stationary body comprising: a housing; a shaft supported for rotation within said housing; an annular member secured to said shaft; an annular member, secured to said housing, spaced from the annular member secured to said shaft; a substantially continuous annular light source attached to one of said annular members; a substantially continuous annular photosensitive detector attached to the other annular member on the side thereof adjacent said light source, means for applying the intelligence bearing signal to said light source and lead means connected to said photosensitive detector whereby an output may be obtained from said photosensitive detector.

References Cited

UNITED STATES PATENTS

| | | | |
|---|---|---|---|
| 2,136,223 | 11/1938 | Thomas | 250—231 X |
| 3,128,387 | 4/1964 | Hughes et al. | 250—237 |
| 3,176,140 | 3/1965 | Schroth | 250—217 X |
| 3,192,387 | 6/1965 | Goodman | 250—217 |
| 3,237,012 | 2/1966 | Treffeisen | 250—219 |
| 3,248,552 | 4/1966 | Bryan | 250—213 |

OTHER REFERENCES

Summer—Photosensitors, 1957, Chapman and Hall, Ltd., pp. 55 and 145.

WALTER STOLWEIN, *Primary Examiner.*